United States Patent [19]
Edge et al.

[11] 4,024,473
[45] May 17, 1977

[54] STROBOSCOPIC DEVICE

[75] Inventors: Gordon Malcom Edge, Saffron Walden; Keith Douglas Ridler, Fulbourn; Frederick James Easthope, Cambridge, all of England
Fulborn; Frederick James Easthope, Cambridge, all of England

[73] Assignee: Strathearn Audio Limited, Belfast, Northern Ireland

[22] Filed: June 30, 1975

[21] Appl. No.: 591,401

[30] Foreign Application Priority Data
July 1, 1974 United Kingdom ............ 29122/74

[52] U.S. Cl. .................................. 324/168; 73/506
[51] Int. Cl.² ......................................... G01P 3/48
[58] Field of Search ............ 324/168, 161; 73/506; 235/92 FQ

[56] References Cited
UNITED STATES PATENTS

| 3,581,561 | 6/1971 | Tomashek | 73/117.2 |
| 3,584,298 | 6/1971 | Kolbiaz | 324/78 |
| 3,611,343 | 10/1971 | Schoenbach | 340/271 |
| 3,672,230 | 6/1972 | Klebl | 73/506 |
| 3,739,276 | 6/1973 | Dornberger | 324/161 |
| 3,739,367 | 6/1973 | Fathauer | 340/271 |

Primary Examiner—Rudolph V. Rolinec
Assistant Examiner—Vincent J. Sunderdick
Attorney, Agent, or Firm—Laff, Whitesel & Rockman

[57] ABSTRACT

An arrangement for use in indicating the speed of rotation of a body including a switch operated by elements which rotate according to the rotation of the body, a frequency generator which has an output signal at a frequency related to the desired speed of rotation of the body and an indicator which is actuated in accordance with the signals from both the switch and the frequency generator.

5 Claims, 6 Drawing Figures

STROBOSCOPIC DEVICE

This invention relates to a method of and apparatus for indicating the speed of rotation of a body, for example of a Gramophone turntable.

It frequently occurs that the speed of rotation of a body in an apparatus varies about a given value and the present invention enables the speed to be indicated in a simple and reliable manner so that corrective action can be taken.

Known methods of indicating the speed of a Gramophone turntable involve the use of stroboscopic effects employing light derived from lamps supplied with mains electricity and are subject to errors due to fluctuations in the frequency of the mains supply.

Embodiments of the present invention will now be described with reference to the accompanying drawings in which.

Figure 1:
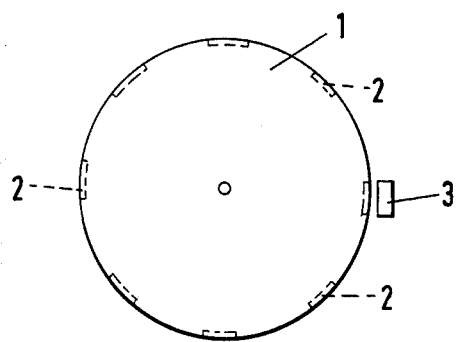
FIG. 1 is a diagrammatic plan view of a Gramophone turntable.

Referring to FIG. 1 there is shown a turntable 1 having eight magnets 2 arranged at equal angular intervals around its circumference. Adjacent the circumference of the turntable 1, a magnetically operated reed switch 3 is arranged in such a way that, upon rotation of the turntable 1, the passage of each of the magnets 2 past the switch 3 causes the switch to be operated. It is possible for the magnets to be arranged on any circle concentric with the turntable, preferably beneath the turntable and for the switch also to be hidden beneath the turntable. Of course, other switch devices operable in accordance with the speed of rotation of the turntable could be used, for example a Hall effect device or an inductive loop coupled to a solid state switching device. Furthermore, the switch device need not be magnetically operated. It is possible, in place of the magnets 2 beneath the turntable, to use a series of light reflecting surfaces on the underside of the turntable which co-operate with a beam of light emitted from beneath the turntable and reflect the light on to a light sensitive solid state switching device positioned beneath the turntable.

Figure 2:
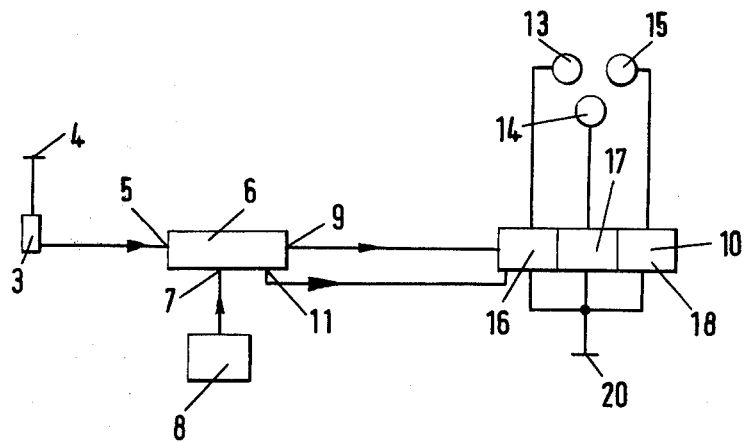
FIG. 2 is a schematic electrical circuit diagram.

As is indicated schematically in FIG. 2, the switch 3 is arranged to connect a voltage supply 4 to one input 5 of a comparator 6. The other input 7 of the comparator 6 is connected to an output from a fixed frequency oscillator 8. The output 9 from the comparator 6, consisting of the best frequency between the inputs at 5 and 7 is coupled to a reversible ring counter 10. The comparator 6 also includes a frequency discriminator which provides an output at 11 which is either positive or negative depending upon whether the frequency at the input 5 is higher or lower than the frequency at the input 7. The output 11 is also coupled to the counter 10 and the direction of counting of the counter 10 is determined according to the polarity of the output at 11.

Three lamps 13, 14 and 15 are coupled to respective stages 16, 17 and 18 of the ring counter 10. The stages 16, 17 and 18 are each switched on by a signal from the preceding stage and switched off by a signal from the next successive stage, the output from the stage 18 being connected by means not shown to the input of the stage 16. Thus input signals to the ring counter 10 from the comparator 6 cause each of the lamps 13, 14, 15 to be connected via the respective stages 16, 17, 18 successively to a voltage source 20 at the frequency rate of the input signals. The direction of transfer of switching from one stage of the counter 10 to the next is determined by the sign of the signal applied from the output 11 of the comparator to the counter.

The frequency of the signal output from the oscillator 8 is fixed at a value which corresponds to the frequency of the signal which is produced by the operation of the switch 3 and which is fed to the input 5 when the turntable is rotated at a desired frequency.

Thus, for example, if the frequency ($f_T$) of the signal developed by the switch 3 is lower than the frequency ($f_D$) of the signal from the oscillator 8, the counter 10 switches in a direction which causes the lamps 13, 14, 15 to be illuminated successively in the anti-clockwise direction. When $f_T$ is greater than $f_D$ the lamps are caused to be illuminated successively in the clockwise direction. The apparent speed of rotation of the illuminated lamp is directly proportional to the beat frequency associated with the two compared frequencies.

When the frequency of the signal developed by the operation of the switch 3 is substantially equal to that of the signal from the output of the oscillator 8 there is no output from the comparator 6 and there is consequently no change in the illumination of the lamps.

It is a simple matter to adjust the speed of the Gramophone motor to cause the illumination of the lamps to be stationary.

A preferred embodiment of stroboscopic device will now be described with reference to FIGS. 3 to 6.

Figure 3:
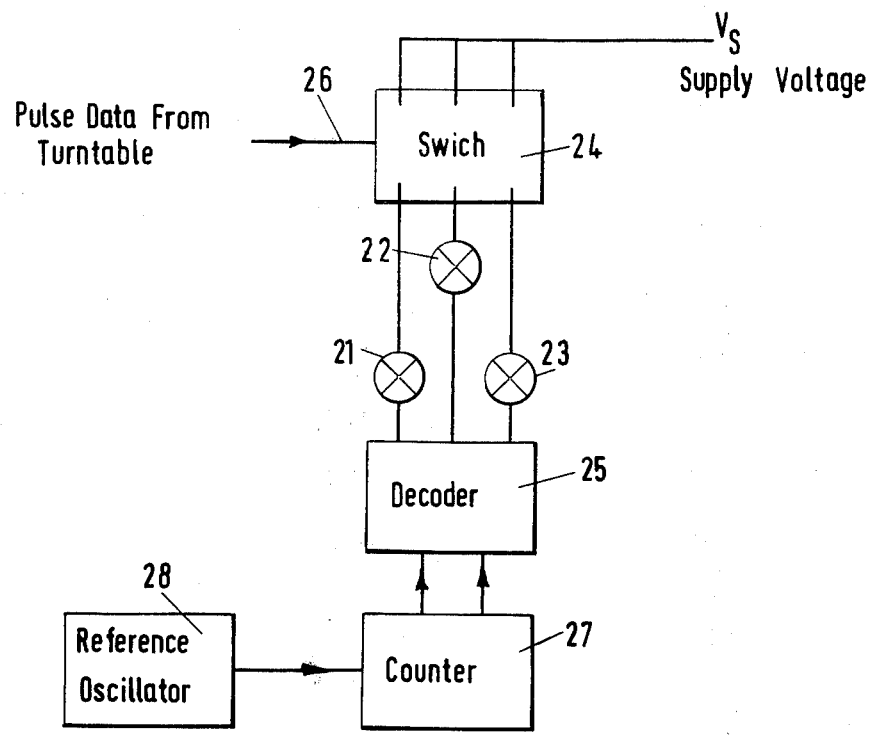
FIG. 3 is a block schematic circuit diagram.

In FIG. 3., there is shown a display arrangement which includes three lamps 21, 22 and 23 connected between one side of a switch 24 and the output from a decoder 25. The other side of the switch 24 is connected to a supply voltage $v_s$ and the operation of the switch is controlled by pulse data from a Gramophone turntable (not shown) applied via a lead 26, e.g., from a device similar to the switch 3 of the arrangement shown in FIGS. 1 and 2. The input to the decoder 25 is obtained from a counter 27 which is controlled by a signal from a reference oscillator 28.

In the particular embodiment shown in FIG. 3, the lamps 21, 22 and 23 are light emitting diodes, but any other indicator device able to assume either one of two possible visible states according to an input signal can be used.

Figure 4:
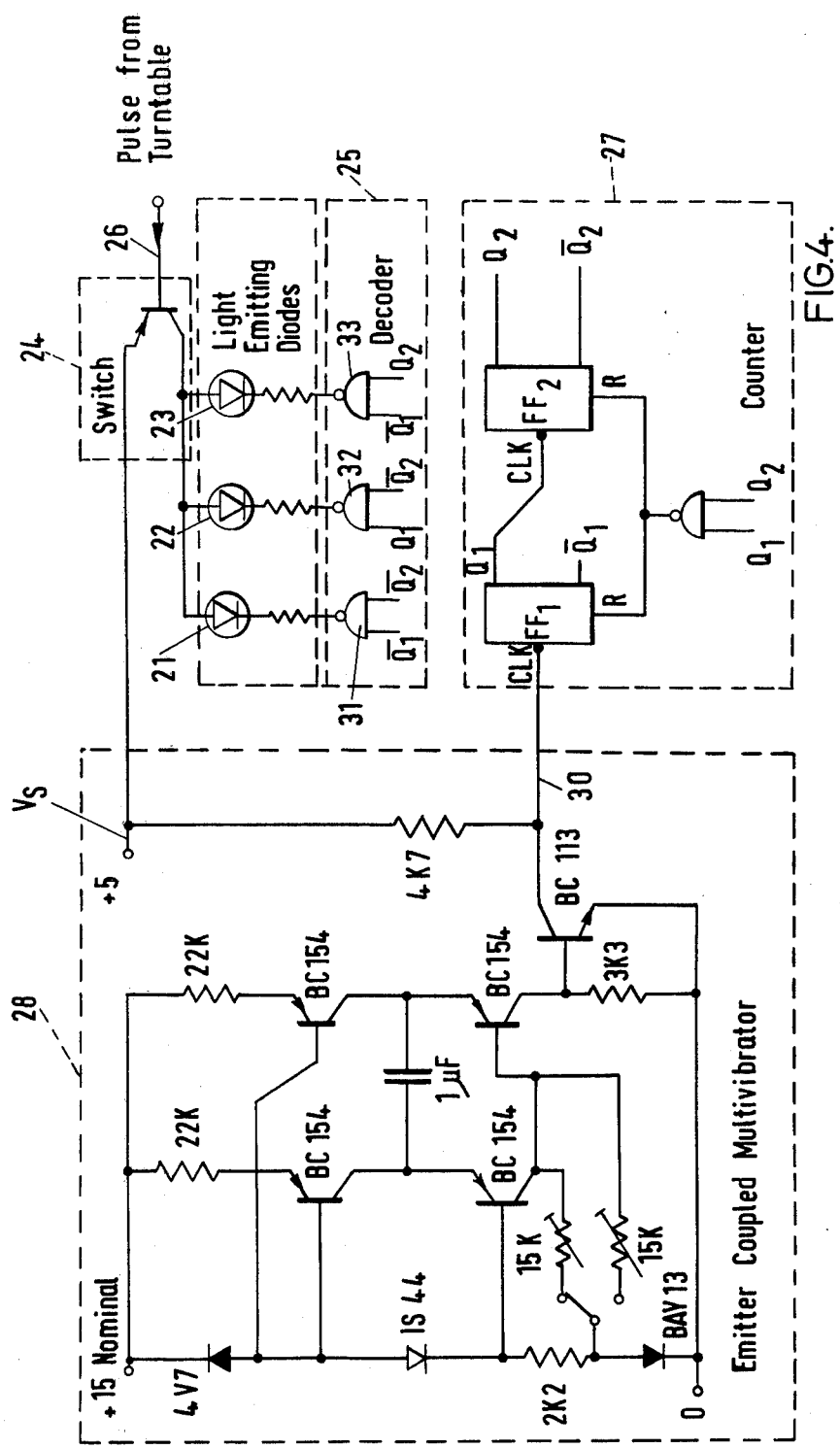
FIG. 4 shows details of circuits in the blocks of FIG. 3.

The details of the circuit arrangement are shown in FIG. 4, from which it can be seen that the oscillator 28 is an emitter coupled multivibrator having an output on a lead 30 to the counter 27 which is constituted by a pair of flip-flops $FF_1$ and $FF_2$ having respective outputs $Q_1$, $\bar{Q}_1$ and $Q_2$, $\bar{Q}_2$. These outputs are connected, (by means not shown) to corresponding inputs of the decoder 25 having gates 31, 32 and 33. The outputs of these gates are connected respectively to the lamps 21, 22 and 23, whose other terminals are connected to the collector of a transistor constituting the switch 24.

In the present embodiment the indicator lamps 21 to 23 are arranged in a circle. In operation the lamps 21 to 23 are illuminated substantially one at a time. When the turntable is running at a speed above its desired speed, the order of illumination of the lamps is such as to make it appear that an illuminated lamp is rotating, probably, but not necessarily, in a clockwise direction, at a speed directly proportional to the difference between the actual and desired turntable speed. When the turntable is running below its desired speed the apparent direction of rotation of the lamp is reversed. When the turntable is running at the desired speed the lamp appears to be stationary or it could be arranged that under this condition it is extinguished.

The lamps 21 to 23 could alternatively be arranged in a straight or curved line so that the overspeed running of the turntable was indicated by a continual apparent lamp motion in one direction and the underspeed running by apparent lamp motion in the other direction. Other lamp arrangements are possible.

The system can be arranged so that more than one lamp is illuminated at any one time with a point of brighter than average light moving as before. Alternatively, it can be arranged for the lamps to be normally on with an unilluminated light apparently moving when the turntable speed is other than required.

Figure 5:
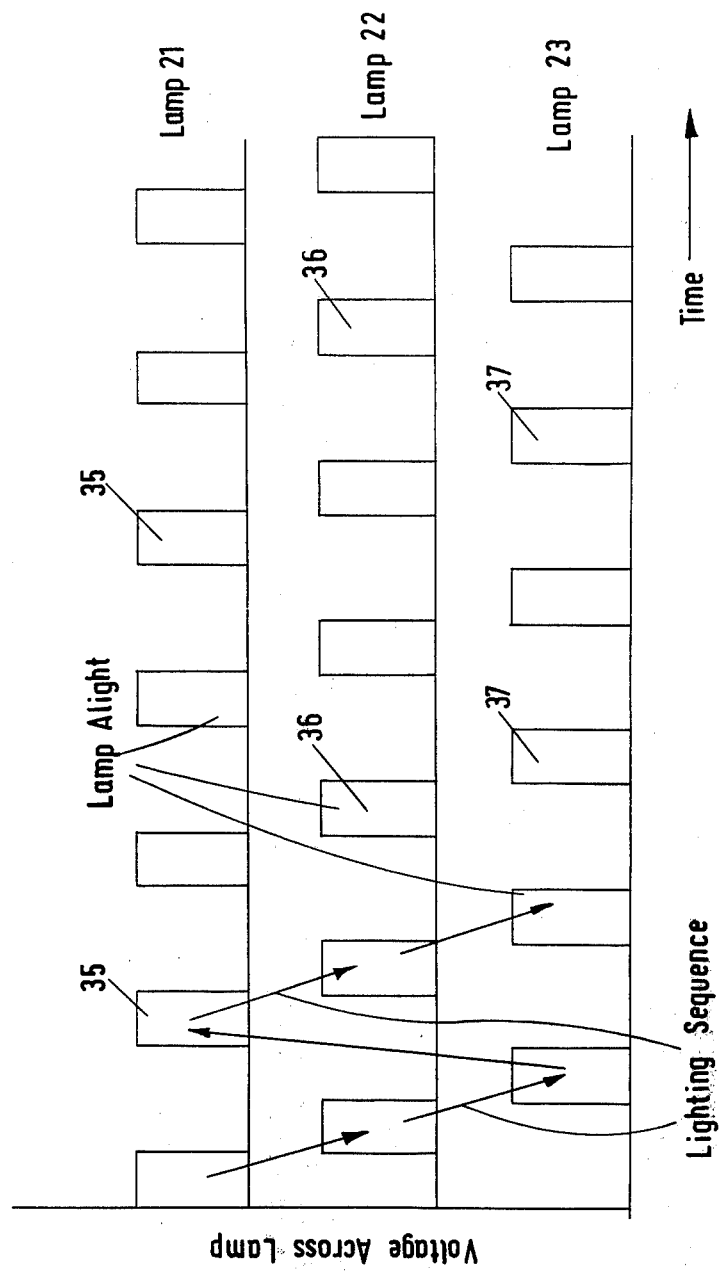
FIGS. 5 and 6 are diagrams illustrating the sequence of operation of lamps with time.

In operation, the reference oscillator 28 supplies a pulse signal with a frequency related to the desired speed of rotation of the turntable. This reference signal is passed to the counter 27 and the decoder 25 to produce an output from the decoder to the lamps such that, with the opposite sides of the lamps to those connected to the decoder connected to the supply line at the voltage $V_S$ (the required supply voltage), the lamps would light sequentially, as indicated by FIG. 5, which indicates, by the rows of pulses 35, 36 and 37, the operation with time of the respective lamps 21, 22 and 23. However, the lamp lighting is further controlled by the switch 24. This switch is associated equally with all three lamps and, if the necessary supply voltage were connected directly across this switch 24 and the lamps 21 to 23 only, then all of the lamps would light up and extinguish at a frequency equal to the frequency generated by the turntable speed monitoring system.

Most simply, the switch-on duration of the switch 24 remains constant regardless of turntable speed and the dwells between switch-on states of switch 24 vary with variation in turntable speed. The net result of this is that only when the switch-on state of a particular lamp, as decided by the reference oscillator 28, counter 27, decoder 25 part of the system, coincides with the switch 24 in the switch-on condition does that lamp light up. This may be more readily understood by combining the switch-on characteristics of the switch 24 and the switching characteristics shown in FIG. 5.

Figure 6:
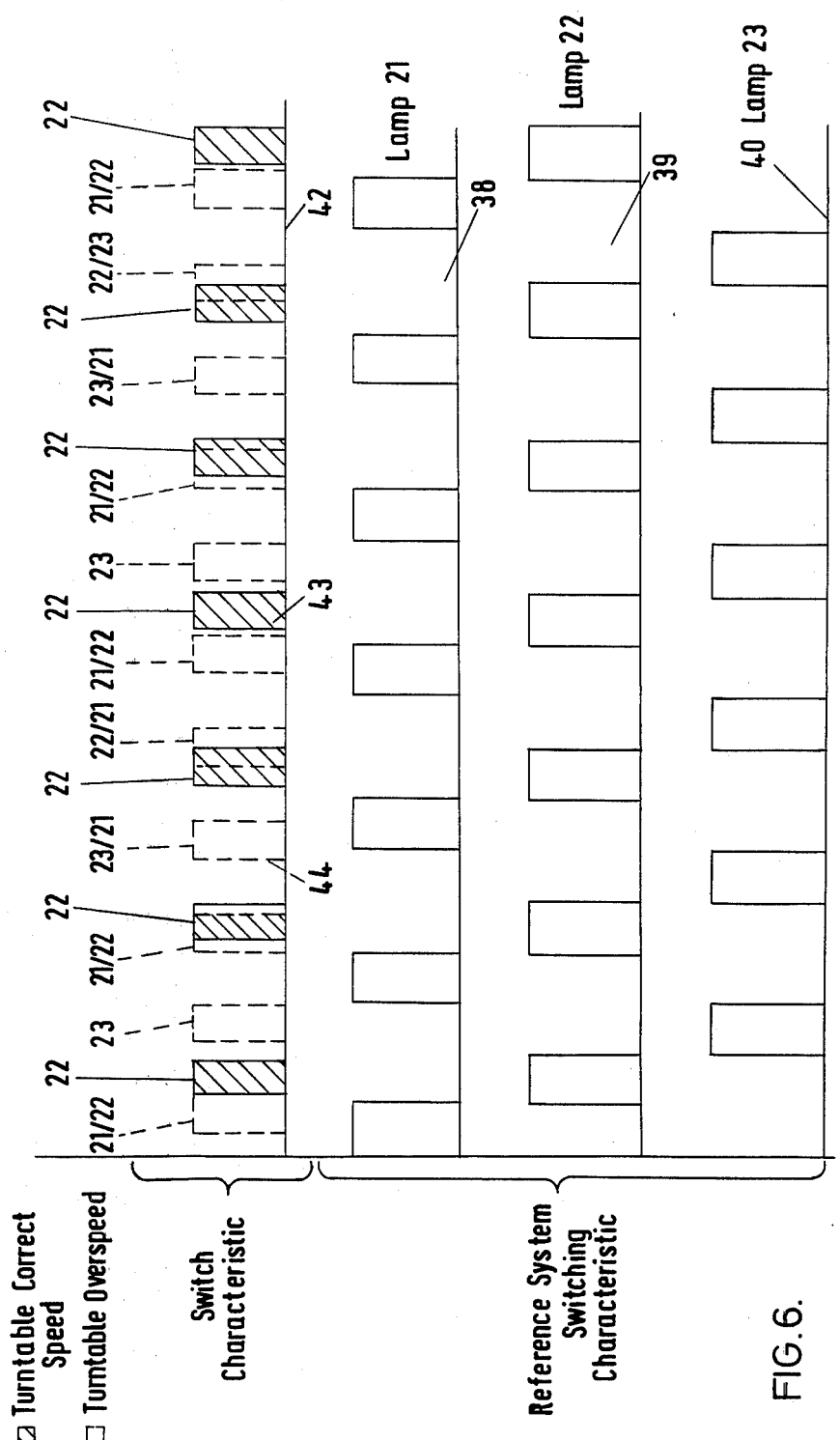

FIG. 6 illustrates this combination for two different turntable speeds. Lines 38, 39 and 40 show the reference switching characteristics for lamps 21, 22 and 23, as previously shown in FIG. 5. Upon line 42 are shown shaded pulses 43 and dotted pulses 44 indicating the "switch-on" characteristics of the switch 24, as determined by the behavior of the turntable monitoring device when the turntable is running at the correct speed and overspeed respectively. The pulses of these characteristics, taken in conjunction with the pulses shown in the other three lines 38, 39 and 40 of the figure determine which lamps are illuminated at any one time, as indicated by the lamp number sequences written above line 42. When the turntable is running at the correct speed only the lamp 22 is illuminated. It will appear to the eye that this lamp is continually illuminated. However, when the turntable is running overspeed, the sequence of illumination of the lamps can be seen to be 21, 22, 23; 21, 22, 23; 21, 22, 23. . .

With the switching frequency for the switch 24, when the turntable is running, at the correct speed of the order of 20 Hz, the eye would not detect substantial flicker and it would appear that the lamps are continually illuminated.

However the switching frequency can be at any other convenient frequency. With the switch 24 operated at other than the correct frequency, a comparatively low frequency rotational illumination effect is obtained.

Depending on the switch-on duration of the switch unit the characteristics of the lamp illumination can be varied. If this duration is much shorter than the switching duration associated with the reference signal for each lamp then at any one time a single lamp only is illuminated. As the switch switch-on duration increases so does the chance that two lamps are alight at any one time until this duration exceeds the reference signal switching duration when at least two lamps are alight at any one time. The lamp lighting frequency is directly related to the difference in frequency between that monitored on the turntable and that of the reference signal.

It will be understood that the display can consist of a number of dual state systems that may be either switched on or off. The two states may be visually or otherwise detected. In the particular embodiment described small lamps or LEDs are used. The number of such indicators and their arrangement is important, but several configurations are possible.

It will be appreciated that more than three lamps or other indicators could be used and that variations and modifications of the particular embodiments, which have been described by way of example only, could be made within the scope of the invention. For example, more or less than eight magnets 2 could be used.

Furthermore, in the embodiment of FIGS. 1 and 2, since synchronism is indicated by an absence of signal from the comparator 6, while the direction of the error, i.e., fast or slow, can be indicated by a positive or negative signal, it is possible to connect the output 9 of the comparator 6 to a single lamp which will be dimmed when synchronism is achieved, but which will give a steady or flickering light according to the amount by which the turntable is out of synchronism. The direction in which adjustment is required to be made being indicated by a device activated by the positive or negative signal output 11. Alternatively, synchronism can be indicated when the illumination of a lamp is at a maximum. It is possible to use other forms of indicator, for example a "magic eye" tuning indicator, or a numerical counter. Where a circle of indicator lamps is used, as in the embodiment described with reference to the drawings, it is possible, instead of lighting successive lamps individually, to light all of the lamps except one successively, so that the effect is produced of the rotation of an unilluminated lamp. It will also be appreciated that other means of generating a signal corresponding to the speed of the turntable or other rotatable member can be used than those described, and that a different number of magnets 2 could be used.

In summary, the invention is concerned with a stroboscopic device when compares the frequency of a signal obtained by monitoring the performance of a rotatable member against a datum signal having the desired frequency. The difference in frequencies then causes, in one embodiment, apparent motion in a series of observably actuated devices. The direction of apparent motion defines the sign of the frequency difference between the two signals and enables a turntable speed to be adjusted until it is, and is observed to be, precisely correct. Of course, the indicator could be a meter calibrated in terms of percentage speed change and it could be operated by controlled power from a separate source. For example, the lamp could be illuminated by current from a controlled oscillator. It will also be understood that the oscillator 8 or 28 could generate a plurality of fixed frequencies, each corresponding to a particular desired speed of rotation of the turntable and being selectable at will.

It is possible to modify the embodiment of FIGS. 3, 4 and 5 by arranging one of a plurality of separate switch elements operated by a signal on the lead 26 in series with each of the lamps 21, 22 and 23. Such a switch element could be connected on either side of its respective lamp.

We claim:

1. An arrangement for use in providing an indication related to the speed of rotation of a body, said arrangement including a plurality of switch operating devices, said switch operating devices being arranged to be rotated at a speed related to the speed of rotation of the body, switch means operated responsive to said devices during their rotation, signal generator means having an output at a frequency related to a desired speed of rotation of the body, indicator means comprising three or more visual display devices, means for providing signals to said visual display devices, said signals relating to both the operation of the switch means and the output from the signal generator means, and means for causing the display devices to be operated according to the phase relationship between the operation of the switch means and the output from the generator means in such a way that the degree of apparent motion of the indicator means in one direction indicates the amount by which the speed of rotation of the body varies in one sense from that of the desired speed, while the degree of apparent motion of the indicator means in another direction indicates the amount by which the speed of rotation of the body varies in the other sense from that of the desired speed.

2. An arrangement as claimed in claim 1 including a plurality of light emitting devices constituting the indicator means, a counter connected to the output of the signal generator, a decoder connected to the output of the counter, an output from the counter being connected to a respective one of the light emitting devices consecutively and the switch being connected to the light emitting devices in such a way that coincidence between the operation of the switch and an output from the counter connected to a respective one of the light emitting devices causes the said one of the devices to emit light.

3. An arrangement as claimed in claim 2 in which the switch is operatively connected to each of the light emitting devices simultaneously.

4. An arrangement as claimed in claim 1, including a plurality of light emitting devices constituting the indicator means, a comparator having first and second inputs and an output and a ring counter having an input and an output, the switch being connected to one of the inputs of the comparator, the signal generator being connected to the other of the inputs of the comparator, an output from the ring counter being connected to a respective one of the light emitting devices and the output from the comparator being connected to the input of the ring counter.

5. An arrangement as claimed in claim 1, in which light emitting diodes constitute the light emitting devices.

* * * * *

UNITED STATES PATENT AND TRADEMARK OFFICE
CERTIFICATE OF CORRECTION

PATENT NO. : 4,024,473
DATED : May 17, 1977
INVENTOR(S) : Gordon M. Edge, et al.

It is certified that error appears in the above-identified patent and that said Letters Patent are hereby corrected as shown below:

Col. 1, line 55, "best" should be --beat--

Signed and Sealed this

Sixth Day of September 1977

[SEAL]

Attest:

RUTH C. MASON
Attesting Officer

LUTRELLE F. PARKER
Acting Commissioner of Patents and Trademarks